US012119552B2

(12) United States Patent
Yuan

(10) Patent No.: US 12,119,552 B2
(45) Date of Patent: Oct. 15, 2024

(54) LENS ANTENNA, DETECTION APPARATUS, AND COMMUNICATION APPARATUS

(71) Applicant: HUAWEI TECHNOLOGIES CO., LTD., Guangdong (CN)

(72) Inventor: Shutian Yuan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 17/930,725

(22) Filed: Sep. 9, 2022

(65) Prior Publication Data

US 2023/0006357 A1 Jan. 5, 2023

Related U.S. Application Data

(63) Continuation of application No. PCT/CN2020/079343, filed on Mar. 13, 2020.

(51) Int. Cl.
*H01Q 15/02* (2006.01)
*H01Q 19/06* (2006.01)

(52) U.S. Cl.
CPC ........... *H01Q 19/062* (2013.01); *H01Q 15/02* (2013.01)

(58) Field of Classification Search
CPC ...... H01Q 19/062; H01Q 15/02; H01Q 3/247; H01Q 5/42; H01Q 19/06; H01Q 21/065; H01Q 21/24; H01Q 25/002; H01Q 1/3233
See application file for complete search history.

(56) References Cited

U.S. PATENT DOCUMENTS

| | | | | |
|---|---|---|---|---|
| 7,667,665 | B1 | 2/2010 | Colburn et al. | |
| 8,604,989 | B1 | 12/2013 | Olsen | |
| 2014/0176377 | A1 | 6/2014 | Merlet et al. | |
| 2014/0225775 | A1 * | 8/2014 | Clevorn | H01Q 3/24 342/372 |
| 2016/0087344 | A1 | 3/2016 | Artemenko et al. | |

FOREIGN PATENT DOCUMENTS

| | | | | |
|---|---|---|---|---|
| CN | 1499669 | A * | 5/2004 | H01Q 1/3233 |
| CN | 102290638 | A | 12/2011 | |
| CN | 206431292 | U | 8/2017 | |
| CN | 107369914 | A | 11/2017 | |
| CN | 107369916 | A | 11/2017 | |

(Continued)

*Primary Examiner* — Dameon E Levi
*Assistant Examiner* — Anh N Ho
(74) *Attorney, Agent, or Firm* — James Harrison

(57) ABSTRACT

This application provides a lens antenna, a detection apparatus, and a communications apparatus. The lens antenna includes a feed source, a radio frequency switch, at least two narrow beam radiation units, and a wide beam radiation unit. The feed source may selectively feed any narrow beam radiation unit or the wide beam radiation unit by using the radio frequency switch. The narrow beam radiation unit or the wide beam radiation unit may be connected to the feed source by switching of the radio frequency switch. A first radiation region of the wide beam radiation unit covers a second radiation region of each narrow beam radiation unit. The wide beam radiation unit includes a plurality of radiation sub-units, and the plurality of radiation sub-units are connected to the radio frequency switch by using a power splitter. In this way, radiation of the plurality of radiation sub-units forms a wide beam.

14 Claims, 7 Drawing Sheets

(56) References Cited

FOREIGN PATENT DOCUMENTS

| | | | | | |
|---|---|---|---|---|---|
| CN | 108173005 | A | | 6/2018 | |
| EP | 1522869 | A1 | * | 4/2005 | ........... C07C 407/00 |
| JP | 2003037541 | A | * | 2/2003 | |
| WO | WO-2015048998 | A1 | * | 4/2015 | ............... G01S 3/38 |
| WO | 2018068803 | A1 | | 4/2018 | |

* cited by examiner

LENS ANTENNA, DETECTION APPARATUS, AND COMMUNICATION APPARATUS

CROSS-REFERENCE TO RELATED APPLICATIONS

This application is a continuation of International Application No. PCT/CN2020/079343, filed on Mar. 13, 2020, the disclosure of which is hereby incorporated by reference in its entirety.

TECHNICAL FIELD

This application relates to the field of communication technologies, and in particular, to a lens antenna, a detection apparatus, and a communication apparatus.

BACKGROUND

In optics, a spherical wave emitted by a point light source on a focal point of a lens is converted into a plane wave after refraction of the lens. A lens antenna with an electromagnetic wave is fabricated by using a same principle as that of the optical lens. The lens antenna includes a lens and a feed source placed on a focal point of the lens, and is an antenna that converts, by using the lens, a spherical wave or a cylindrical wave of the feed source into a plane wave to obtain a pen-shaped, sector-shaped, or another-shaped beam.

All radar antennas in a conventional technology are lens antennas, but all radar antennas in the conventional technology are narrow beam antennas. Beam scanning is implemented by switching four beams. However, due to a limitation of a beam width, this radar can only be used for long-range target detection. A short-range target needs to be detected by another radar. A function of this radar is single.

SUMMARY

This application provides a lens antenna, a detection apparatus, and a communication apparatus, to improve a detection effect of the detection apparatus.

According to a first aspect, a lens antenna is provided and is applied to a detection apparatus. The lens antenna includes a feed source, a radio frequency switch, at least two narrow beam radiation units, and a wide beam radiation unit, where the feed source is configured to selectively send a signal to the narrow beam radiation unit and the wide beam radiation unit. For example, the feed source may selectively feed any narrow beam radiation unit or the wide beam radiation unit by using the radio frequency switch. The narrow beam radiation unit or the wide beam radiation unit may be connected to the feed source by switching of the radio frequency switch. A first radiation region of the wide beam radiation unit covers a second radiation region of each narrow beam radiation unit. The wide beam radiation unit includes a plurality of radiation sub-units. The plurality of radiation sub-units are connected to the radio frequency switch by using a power splitter. In this way, radiation of the plurality of radiation sub-units forms a wide beam. In the foregoing technical solution, switching between a narrow beam and a wide beam can be implemented by using the radio frequency switch. When scanning needs to be performed, the wide beam may be used. When communication needs to be performed for a specific region, the narrow beam may be used through switching. This improves a detection effect of the detection apparatus.

In a specific implementable solution, a sum of regions covered by all the second radiation regions is the same as the first radiation region. Certainly, the first radiation region may be alternatively greater than the regions covered by all the second radiation regions.

In a specific implementable solution, the at least two narrow beam radiation units are disposed around the wide beam radiation unit. In this way, regions covered by the narrow beam and the wide beam can overlap each other.

In a specific implementable solution, a distance between each of the narrow beam radiation units and any adjacent radiation sub-unit is not less than a wavelength corresponding to an operating frequency band of the lens antenna. This reduces energy coupling between different radiation units.

In a specific implementable solution, the narrow beam radiation unit and the wide beam radiation unit may be arranged in different manners. For example, the plurality of narrow beam radiation units are arranged in two rows. The plurality of radiation sub-units are arranged in a single row, and are located between the two rows of the narrow beam radiation units.

In a specific implementable solution, each radiation unit may be arranged in a plurality of manners, and may be specifically disposed based on a radiation direction. For example, one diagonal line of each narrow beam radiation unit in each row is parallel to a first direction. The first direction is an arrangement direction of each row of narrow beam radiation units. One diagonal line of each radiation sub-unit is parallel to the first direction.

In a specific implementable solution, at least one of the following is met: The lens antenna is a dual-polarized antenna; and/or each narrow beam radiation unit is a square radiation patch; and/or each radiation sub-unit is also a square radiation patch. This can implement dual-polarization radiation.

In a specific implementable solution, a notch for increasing a beam width is provided on a side of each radiation sub-unit, to enlarge a coverage region of the wide beam.

In a specific implementable solution, a notch that reduces an area of the radiation sub-unit is provided on the side of each radiation sub-unit.

In a specific implementable solution, the notch is a triangle.

In a specific implementable solution, the notch may further increase a distance between the radiation sub-unit and the narrow beam radiation unit, thereby reducing coupling.

In a specific implementable solution, a substrate is further included. The substrate includes a first surface and a second surface that are opposite to each other. The narrow beam radiation unit and the wide beam radiation unit are disposed on the first surface. The power splitter, the radio frequency switch, and the feed source are disposed on the second surface. The lens antenna is carried by the substrate.

In a specific implementable solution, the lens antenna further includes a stratum, and the stratum is embedded in the substrate and is located between the first surface and the second surface.

In a specific implementable solution, the power splitter is an equal-power splitter. Therefore, the plurality of radiation sub-units have equal power.

In a specific implementable solution, the plurality of radiation sub-units have equal power and a same phase, to improve coverage of a wide beam formed after superposition.

In a specific implementable solution, the power splitter may be a microstrip power splitter, a waveguide power splitter, or a coaxial power splitter. A connection between the radiation unit and the feed source is implemented by using different power splitters.

According to a second aspect, a detection apparatus is provided, where the detection apparatus includes a processor and any one of the foregoing lens antennas connected to the processor. In the foregoing technical solution, switching between a narrow beam and a wide beam may be implemented by using a radio frequency switch. When scanning needs to be performed, the wide beam may be used. When communication needs to be performed for a specific region, the narrow beam may be used through switching. This improves a detection effect of the detection apparatus.

According to a third aspect, a communication apparatus is provided, where the communication apparatus includes a processor and any one of the foregoing lens antennas connected to the processor. In the foregoing technical solution, switching between a narrow beam and a wide beam may be implemented by using a radio frequency switch. When scanning needs to be performed, the wide beam may be used. When communication needs to be performed for a specific region, the narrow beam may be used through switching. This improves a detection effect of a detection apparatus.

According to a fourth aspect, an intelligent vehicle is provided, where the intelligent vehicle includes a vehicle body and the foregoing detection apparatus disposed in the vehicle body. In the foregoing solution, switching between a narrow beam and a wide beam can be implemented by using a radio frequency switch. When scanning needs to be performed, the wide beam may be used. When communication needs to be performed for a specific region, the narrow beam may be used through switching. This improves a detection effect of the detection apparatus.

DESCRIPTION OF EMBODIMENTS

For ease of understanding, an application scenario of a lens antenna provided in an embodiment of this application is first described. The lens antenna provided in this embodiment of this application may be used with a detection apparatus or a communication apparatus. The detection apparatus may be a millimeter wave radar or another type of radar. The communication apparatus may be a common communication apparatus that can transmit and receive signals, for example, a base station or a router.

Figure 1:
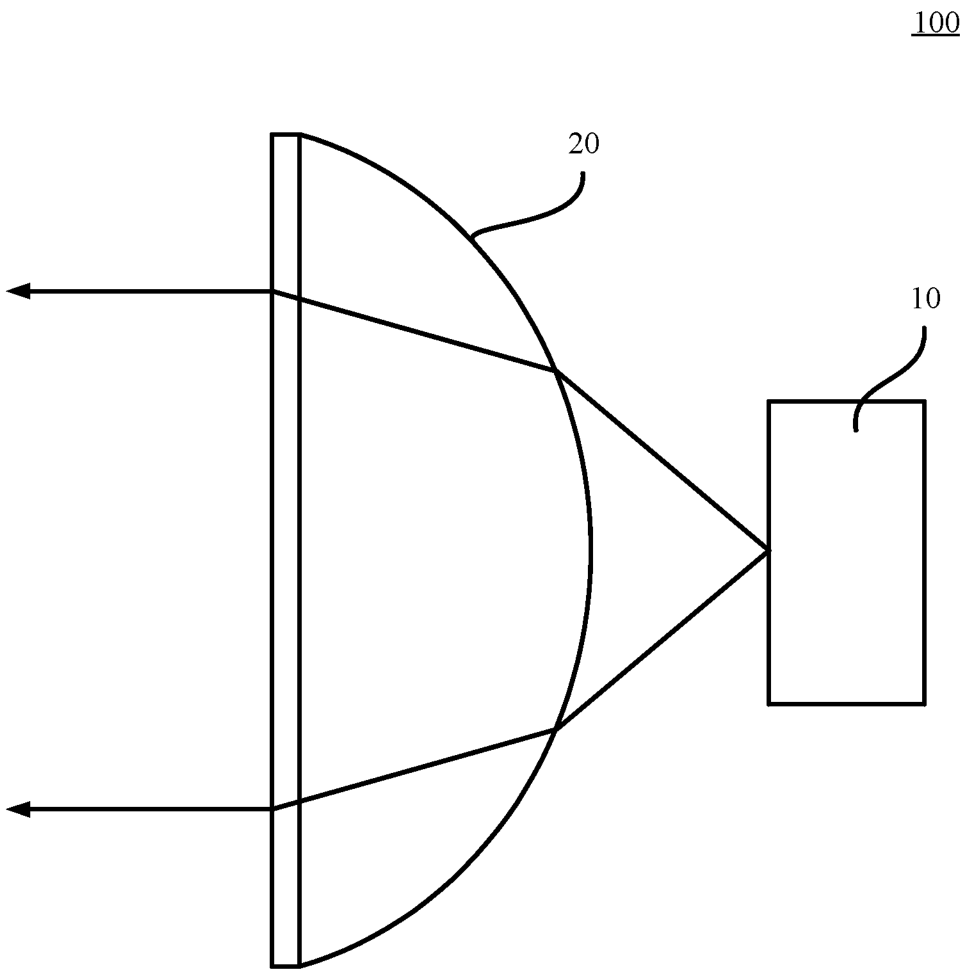
FIG. 1 is a schematic diagram of a structure of a lens antenna according to an embodiment of this application.

FIG. 1 shows an embodiment of a lens antenna. A lens antenna 100 provided in this embodiment of this disclosure includes a lens 20 and an antenna 10 placed on a focal point of the lens 20. In optics, the lens 20 can enable a spherical wave emitted by a point light source placed on a focal point of the lens 20 to be converted into a plane wave after refraction of the lens 20. The lens antenna 100 is fabricated by using a same principle as that of the optical lens 20. The lens antenna 100 converts a spherical wave or a cylindrical wave of the antenna 10 into a plane wave by using the lens 20 to obtain a pen-shaped, sector-shaped, or another-shaped beam. The lens 20 may be in different forms, for example, the lens 20 is a planar lens 20 or a curved lens 20. The lens antenna 100 provided in this embodiment of this application only involves a change of the antenna 10. The lens 20 in the lens antenna 100 may be an existing known lens 20, and details are not described herein.

Figure 2:
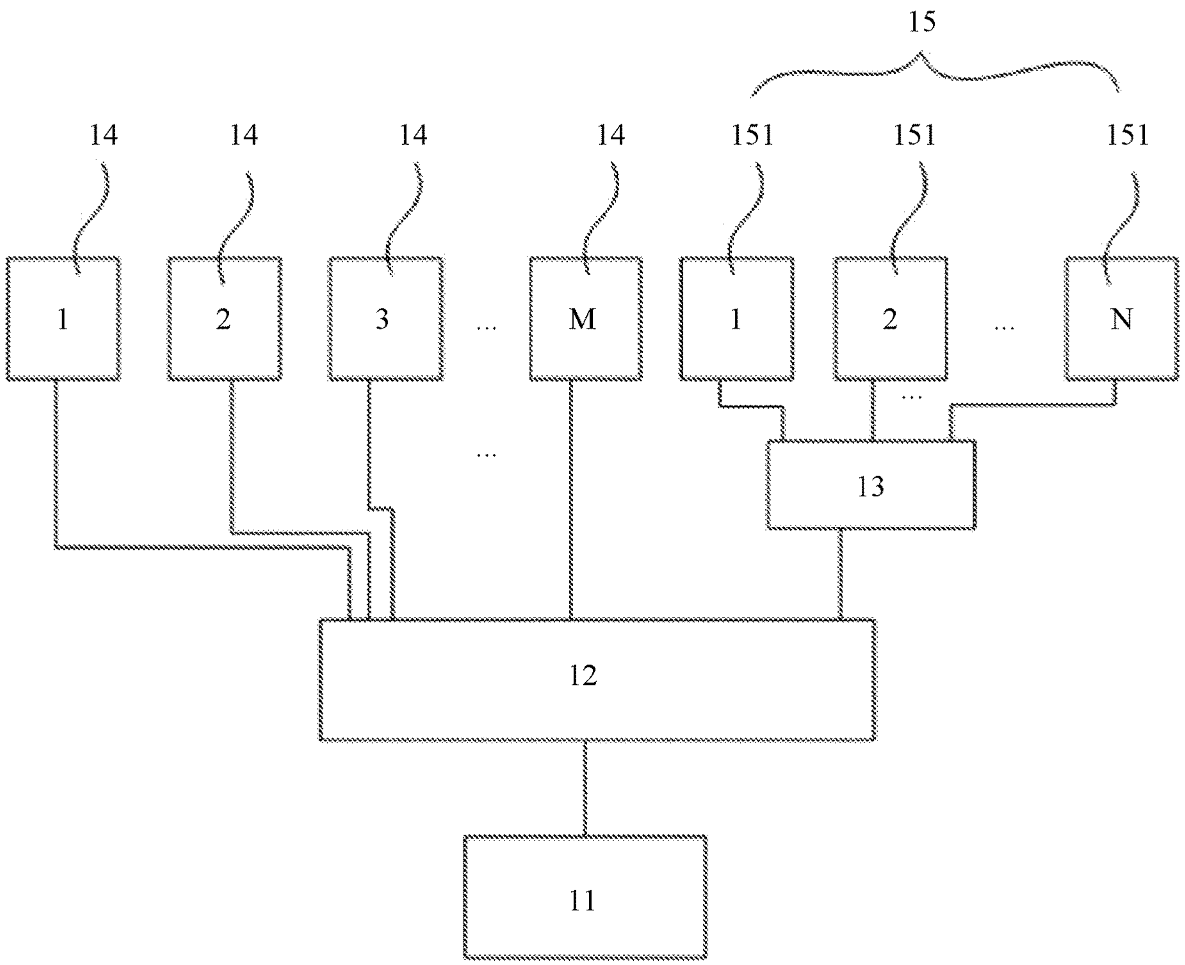
FIG. 2 is a block diagram of an antenna structure of a lens antenna according to an embodiment of this application.

FIG. 2 is a block diagram of an antenna structure of a lens antenna according to an embodiment of this application. The antenna includes a feed source 11, a radio frequency switch 12, and radiation units. The feed source 11 is connected to the radio frequency switch 12 by using a circuit. The radio frequency switch 12 is a selector switch. The feed source 11 may be selectively connected to any radiation unit. For example, the radio frequency switch 12 is a single-pole multi-throw switch. A movable terminal of the radio frequency switch 12 is connected to the feed source 11 by using a circuit. A non-movable terminal of the radio frequency switch 12 includes a plurality of connection points, and the plurality of connection points are correspondingly connected to the radiation units one by one by using circuits.

There are a plurality of radiation units provided in this embodiment of this application. The plurality of radiation units may be classified into a narrow beam radiation units 14 and a wide beam radiation unit 15 based on function division. A plurality of narrow beam radiation units 14 may be set based on a requirement, and there is one wide beam radiation unit 15 in the described embodiment. As shown in FIG. 2, for example, there are N M narrow beam radiation units 14 and one wide beam radiation unit 15, where N M is a positive integer greater than or equal to 2. For the narrow beam radiation units 14 and the wide beam radiation unit 15, FIG. 2 shows only an example of types of the radiation units, and does not specifically indicate an actual arrangement manner of the radiation units.

Still referring to FIG. 2, the wide beam radiation unit 15 includes a plurality of radiation sub-units 151. FIG. 2 shows M N radiation sub-units 151, where M N is a positive integer greater than 2. A specific quantity of the radiation sub-units 151 may be limited based on a range that needs to be covered by the wide beam radiation unit 15. The plurality of radiation sub-units 151 are connected by using a power splitter 13. One terminal of the power splitter 13 is connected to the radio frequency switch 12. The other terminal of the power splitter 13 has a plurality of ports, and the plurality of ports are correspondingly connected to the plurality of radiation sub-units 151 of the wide beam radiation unit 15 one by one.

FIG. 2 is a block diagram of a structure of a connection between the radiation unit of the lens antenna being a single-polarized antenna and the feed source 11. When the lens antenna is a dual-polarized antenna, there are two feed sources 11, two radio frequency switches 12, and two power splitters 13. The two feed sources 11 are separately configured to feed one polarization direction of the radiation unit. A feeding circuit in each polarization direction is the same as a feeding circuit of the single-polarized antenna.

Figure 3:
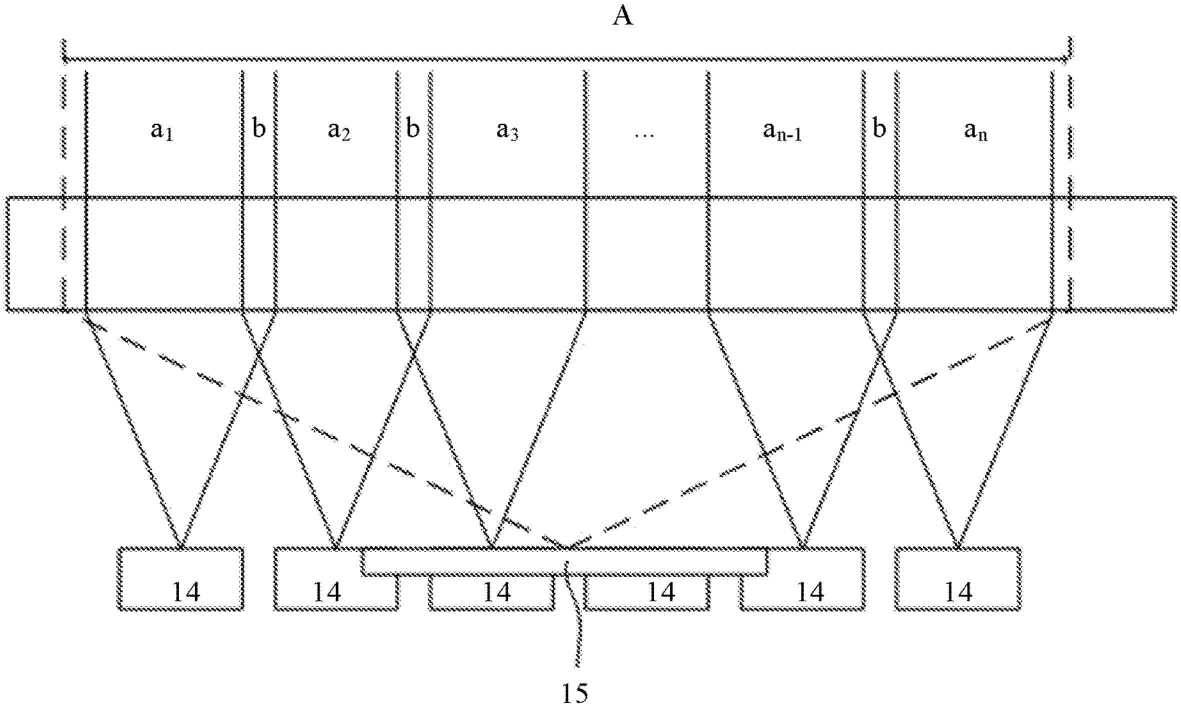
FIG. 3 is a schematic diagram of radiation regions of a narrow beam radiation unit and a wide beam radiation unit according to an embodiment of this application.

FIG. 3 is a schematic diagram of radiation regions of the wide beam radiation unit 15 and the narrow beam radiation units 14. In FIG. 3, for example, N M second radiation regions a1, a2, a3, . . . , and an, and one first radiation region A are shown. The first radiation region is a radiation region of the wide beam radiation unit 15, and the second radiation region is a radiation region produced by each narrow beam radiation unit 14. The first radiation region of the wide beam radiation unit 15 is a radiation region formed by overlapping radiation regions of the plurality of radiation sub-units. It may be seen in FIG. 3 that the first radiation region A overlaps each second radiation region, and the first radiation region A of the wide beam radiation unit 15 covers the second radiation region of each of the narrow beam radiation units 14. In this embodiment of this application, the first radiation region A may be greater than or equal to a sum of the second radiation regions. The sum of the second radiation regions is a sum of superposition of regions covered by all the second radiation regions.

When there is an overlapped region between different second radiation regions, the sum of regions covered by the second radiation regions includes non-overlapped regions between the second radiation regions and the overlapped region between the second radiation regions. For example, an overlapped region of any two second radiation regions is b, and a sum of the second radiation regions is $B=a_1+a_2+a_3+\ldots+a_n-b*(n-1)$. In an optional implementation solution, a sum of regions covered by all the second radiation regions is the same as the first radiation region, that is, A=B. Certainly, the first radiation region may be alternatively greater than the sum of the regions covered by all the second radiation regions.

Figure 4:
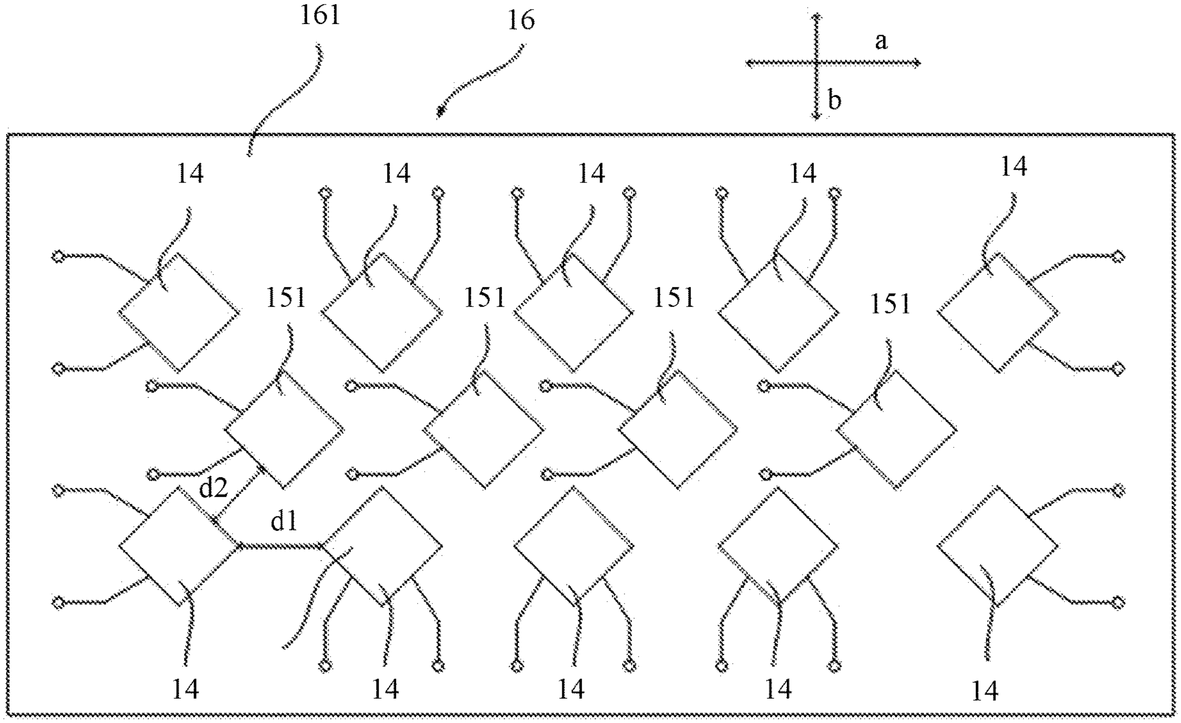
FIG. 4 is a top view of an antenna of a lens antenna according to an embodiment of this application.

FIG. 4 is a top view of the antenna when M=10 and N=4. The lens antenna includes one substrate 16. The substrate 16 may use different materials, for example, a printed circuit board or another type of circuit board. This is not specifically limited herein. The substrate 16 is a structure that carries a component of the antenna. As shown in FIG. 4, the substrate 16 has a first surface 161. The wide beam radiation unit and the narrow beam radiation units 14 are all disposed on the first surface 161 of the substrate 16. When the wide beam radiation unit and the narrow beam radiation units 14 are specifically disposed, it should be ensured that the first radiation region of the wide beam radiation unit can cover the second radiation regions of narrow beams. In an optional solution, M narrow beam radiation units 14 may be disposed around the wide beam radiation unit to surround the wide beam radiation unit. As such, the wide beam radiation unit is located in the middle, and the M narrow beam radiation units 14 are disposed outside. In this way, an installation structure is beautiful, and the first radiation region of the wide beam radiation unit can more easily cover second radiation regions of the M narrow beam radiation units.

It should be noted that disposing the narrow band units around the wide band unit in this manner is an example embodiment. In an actual integration process, the wide beam radiation unit and the narrow beam radiation units do not require a physical installation structure. Under another embodiment of a layout, the first radiation region can also cover all second radiation regions. For example, the plurality of radiation sub-units 151 may be arranged in a single row, and may be disposed between two rows of the narrow beam radiation units 14.

Referring to FIG. 4, the 10 narrow beam radiation units 14 are arranged in two rows in a direction b. Each row of narrow beam radiation units 14 includes five narrow beam radiation units 14, and each row of narrow beam radiation units 14 is arranged in a direction a. The direction a is a first direction, and the first direction is a length direction of the substrate 16. The direction b is a second direction, and the second direction is a width direction of the substrate 16. Five radiation sub-units 151 are arranged in the direction a, and the radiation sub-units 151 are located between the two rows of narrow beam radiation units 14. That is, the two rows of narrow beam radiation units 14 surround one row of radiation sub-units 151. During arrangement, the four radiation sub-units 151 are disposed between gaps of the narrow beam radiation units 14. As shown in FIG. 4, one radiation sub-unit 151 is located in space enclosed by four narrow beam radiation units 14. This can effectively reduce a space area occupied by the radiation units.

The radiation sub-unit 151 and the narrow beam radiation unit 14 may be fastened to the substrate 16 in a patch manner. Alternatively, a metal layer may be formed through vapor deposition on the first surface 161 of the substrate 16, and then the metal layer is etched to form the radiation sub-unit 151 and the wide beam radiation unit.

Still referring to FIG. 4, in an optional solution, the lens antenna is a dual-polarized antenna, and the radiation sub-unit 151 and the narrow beam radiation unit 14 of the lens antenna are all square radiation units, so as to ensure that polarization directions of each radiation unit are perpendicular to each other. As shown in FIG. 4, two adjacent sides of any radiation unit (the radiation sub-unit 151 or the narrow beam radiation unit 14) are separately connected to one pin, and the two pins are respectively corresponding to feeds in two opposite polarization directions. In an optional solution, sizes of the wide beam radiation unit and the narrow beam radiation unit 14 may be equal or unequal.

The narrow beam radiation unit 14 and the radiation sub-unit 151 may be arranged in different manners. In an optional solution, a diagonal line of each narrow beam radiation unit 14 is parallel to the direction a, and a diagonal line of each radiation sub-unit 151 is parallel to the direction a. In this arrangement manner, the narrow beam radiation unit 14 may overlap in both the direction b and the direction a. Therefore, an area occupied by the radiation units on the first surface 161 can be reduced.

It should be understood that the foregoing arrangement manner of the wide beam radiation unit and the narrow beam radiation unit 14 is only a specific example. In this embodiment of this application, the wide beam radiation unit and the narrow beam radiation unit 14 may be alternatively disposed in another arrangement manner. During antenna design, a specific arrangement manner of the narrow beam radiation unit 14 and the wide beam radiation unit may be determined based on a region that needs to be covered by the lens antenna. For example, when the radiation sub-unit 151 is to be determined, an equation between a composite beam of the radiation sub-unit 151 and a feeding amplitude and a phase of the radiation sub-unit 151 is obtained by using a calculation formula of array antenna beam combination. By using a beam direction, a beam width, and a beam gain as optimization target values, an arrangement manner of the radiation sub-units 151 is obtained by using a computer to search for and calculate an optimal solution for a feeding relationship of each radiation sub-unit 151 to meet a constraint. The foregoing calculation formula of array antenna beam combination and a formula used by the computer to search for and calculate the feed relationship of each radiation sub-unit 151 are common formulas in a conventional technology. Therefore, details are not described herein.

In an optional solution, a distance between each narrow beam radiation unit 14 and any adjacent radiation sub-unit 151 or narrow beam radiation unit 14 is not less than a wavelength λ corresponding to an operating frequency band of the lens antenna. As shown in FIG. 4, a distance between adjacent narrow beam radiation units 14 is d1, and a distance between the narrow beam radiation unit 14 and the radiation sub-unit 151 that are adjacent to each other is d2, where $d1 \geq \lambda$ and $d2 \geq \lambda$. When the foregoing manner is used, it is ensured that there is an enough distance between any two radiation units, to avoid impact on performance of the radiation unit in operation that is from a parasitic current generated on an adjacent radiation unit when any one of the radiation sub-units 151 or the narrow beam radiation units 14 operates.

Figure 5:
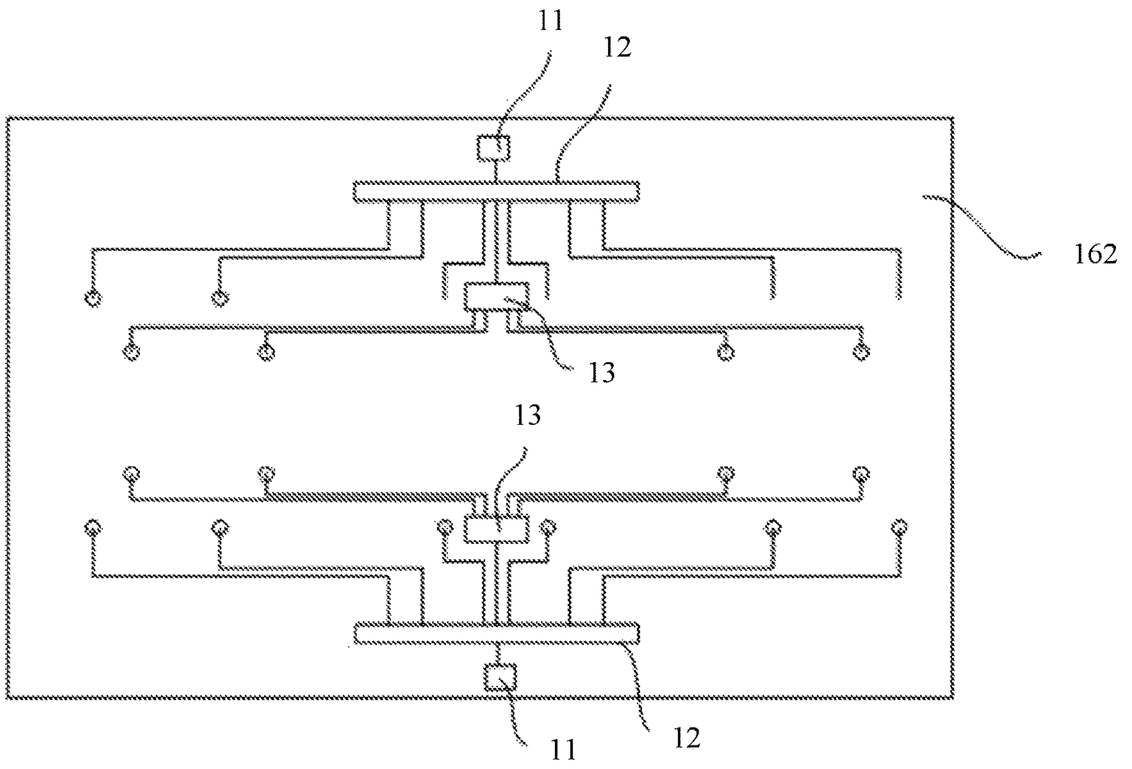
FIG. 5 is a bottom view of an antenna of a lens antenna according to an embodiment of this application.

FIG. 5 is a bottom view of an antenna of a lens antenna according to an embodiment of this application. In FIG. 5, the substrate 16 further has a second surface 162. The power splitter 13, the radio frequency switch 12, and the feed source 11 in the antenna are disposed on the second surface 162. The second surface 162 and the first surface are two opposite surfaces. When components of the antenna are respectively carried on the first surface and the second surface 162, a quantity of components disposed on each surface may be reduced by using two different surfaces. This facilitates antenna arrangement. When the lens antenna is a dual-polarized antenna, there are two feed sources 11, two power splitters 13, and two radio frequency switches 12. One feed source 11 is connected to the radiation sub-unit and the narrow beam radiation unit in one polarization direction by using one radio frequency switch 12. The other feed source 11 is connected to the radiation sub-unit and the narrow beam radiation unit in the other polarization direction by using the other radio frequency switch 12. In addition, each radiation sub-unit 151 is connected to one power splitter 13 in one polarization direction.

In one embodiment, the power splitter 13 is an equal-power splitter. When there are four radiation sub-units, the power splitter 13 is a quad power splitter 13. The power splitter 13 divides signals transmitted from the feed source 11 into four equal parts, and sends each equal part of signals to a corresponding connected radiation sub-unit. The four radiation sub-units have equal power. In addition, the power splitter 13 transmits a same phase signal to each radiation sub-unit 151, so that the four radiation sub-units have equal power and a same phase. Therefore, the wide beam radiation unit has a widest first radiation region. In addition, when equal power is used, design of the power splitter 13 is simplified, and no additional power and phase adjustment units need to be inserted. When there is another quantity of radiation sub-units, the power splitter 13 is connected to the radiation sub-unit 151 in a corresponding equal power division manner, so that the radiation sub-units can also have equal power and a same phase.

When the power splitter 13 is specifically disposed, different power splitters 13 may be used. For example, the power splitter 13 may be a microstrip power splitter, a waveguide power splitter, or a coaxial power splitter, which can be applied to embodiments of this application.

Figure 6:
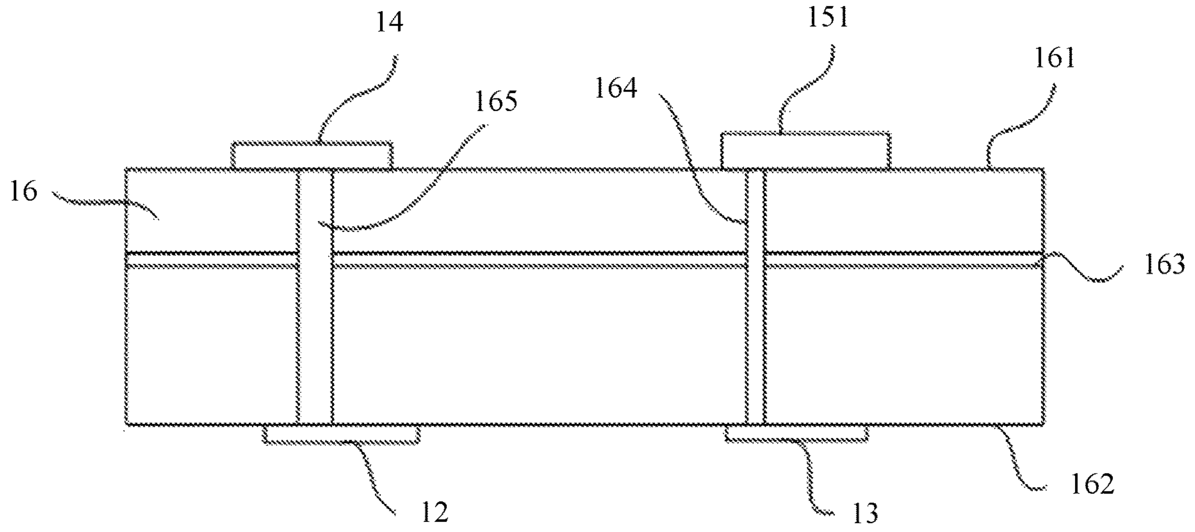
FIG. 6 is a schematic diagram of an internal structure of a lens antenna.

FIG. 6 is a schematic diagram of an internal structure. When the radiation unit and the power splitter 13 are respectively disposed on different surfaces, the radiation unit may be connected to the power splitter 13 or the radio frequency switch 12 through a via provided in the substrate 16. As shown in FIG. 6, the narrow beam radiation unit 14 is connected to the radio frequency switch 12 through a first via 165, and the radiation sub-unit 151 is connected to the power splitter 13 through a second via 164.

Still referring to FIG. 6, the antenna further includes a stratum, and the stratum is embedded in the substrate 16 and is located between the first surface 161 and the second surface 162. The radiation unit is separated from a feeding network (a circuit including the power splitter 13 and the radio frequency switch 12) by using the stratum. When the stratum is disposed between the first surface 161 and the second surface 162, the first via 165 and the second via 164 separately pass through the stratum, but the first via 163 and the second via 164 are separately insulated from the stratum.

When the foregoing lens antenna is used, when a signal is required to cover a large region, the wide beam radiation unit may be connected to the feed source by using the radio frequency switch 12. The feed source covers the large first radiation region by using the wide beam radiation unit. When targeted communication needs to be performed for a specific region, the narrow beam radiation unit 14 corresponding to the region may be connected to the feed source by switching the switch, and the feed source covers the region that requires targeted communication by using the second radiation region of the narrow beam radiation unit 14. It may be learned from the foregoing description that the lens antenna provided in this embodiment of this application can perform scanning in a large region, and can perform the targeted communication for the specific region. This improves a detection effect of the antenna. According to the lens unit provided in this embodiment of this application, for an application scenario in which a plurality of narrow beams are required, when there is a small quantity of narrow beams, the wide beam radiation unit may not be disposed. The targeted communication can be implemented only by switching of the narrow beam radiation units 14. However, when there is a large quantity of the narrow beam radiation units 14, switching one by one causes low operating efficiency of the antenna. Therefore, after the wide beam radiation unit is first used to perform large range scanning, and then the region that requires targeted communication is determined, the narrow beam radiation unit 14 corresponding to the region can be directly switched. This can effectively improve operating efficiency of the antenna.

Figure 7:
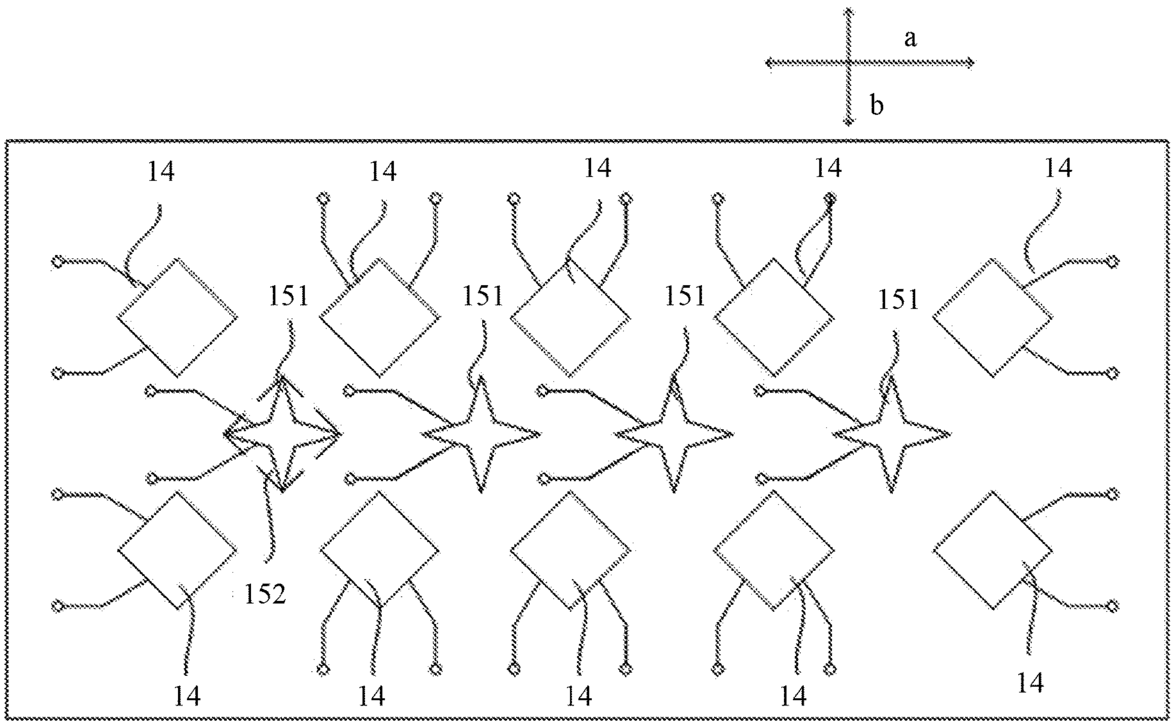
FIG. 7 is a top view of a second lens antenna according to an embodiment of this application.

FIG. 7 shows a second lens antenna according to an embodiment of this application. For some reference numerals in FIG. 7, refer to same reference numerals in FIG. 3. A difference between the lens antenna shown in FIG. 7 and the lens antenna shown in FIG. 3 lies in a different shape of a radiation unit. As shown in FIG. 7, a notch 152 for increasing a beam width is provided on a side of each radiation sub-unit 151. A smaller area of a radiation unit indicates a larger radiation region corresponding to the radiation unit. Therefore, the notch 152 that reduces an area of the radiation sub-unit 151 is provided on the side of each radiation sub-unit 151. This can effectively reduce the area of the radiation sub-unit 151. The notch 152 of the radiation sub-unit 151 in FIG. 7 may be considered as a structure formed by cutting off a triangular notch 152 on each side of the square radiation sub-unit 151 shown in FIG. 4. After a triangle is cut off on each side, the radiation sub-unit 151 forms a cross-star structure. Alternatively, another different shape of notch 152 may be used, for example, a trapezoidal notch 152 or an arc notch 152.

Still referring to FIG. 7, an arrangement manner of the narrow beam radiation units 14 and the wide beam radiation unit in FIG. 7 is the same as that in FIG. 4. One diagonal line of each narrow beam radiation unit 14 is parallel to a direction a, and one diagonal line of each radiation sub-unit 151 is parallel to the direction a. When the radiation sub-unit 151 uses a cross-star shape, a diagonal line of the radiation sub-unit 151 is a line between two opposite end corners.

In addition, it can be learned from FIG. 7 that when the radiation sub-unit 151 is provided with the notch 152, a distance between the radiation sub-unit 151 and an adjacent narrow beam radiation unit 14 can be effectively increased. This reduces impact on performance of the antenna from a parasitic current generated on an adjacent radiation unit when the radiation sub-unit 151 or the narrow beam radiation unit 14 operates.

Figure 8:
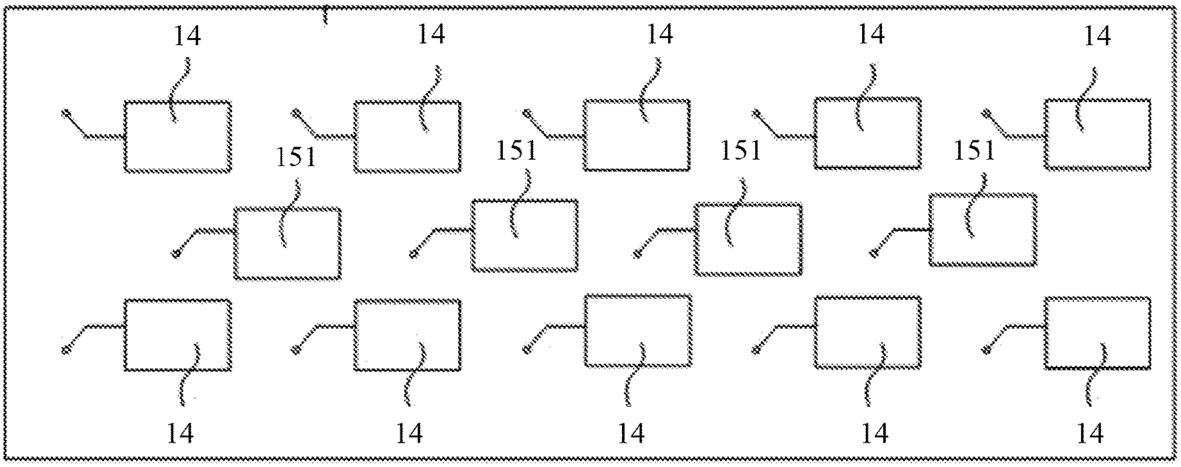
FIG. 8 is a top view of a third lens antenna according to an embodiment of this application.

FIG. 8 shows a third lens antenna according to an embodiment of this application. For some reference numerals in FIG. 8, refer to same reference numerals in FIG. 3. A difference between the lens antenna shown in FIG. 8 and the lens antenna shown in FIG. 3 lies in a different shape of a radiation unit. The lens antenna shown in FIG. 8 is a single-polarized antenna. When the single-polarized antenna is used, a different shape may be selected as a shape of the radiation unit. As shown in FIG. 8, shapes of narrow beam radiation units 14 and radiation sub-units 151 are all rectangular. Certainly, when the single-polarized antenna is used, the shapes of the narrow beam radiation units 14 and the radiation sub-units 151 may be alternatively square. However, there is only one connection port between the wide beam radiation unit and the narrow beam radiation unit 14. A feed source is connected to the radiation sub-unit 151 by using one power splitter.

When the lens antenna is the single-polarized antenna, the radiation sub-unit 151 may alternatively use the notch shown in FIG. 7. For a specific arrangement manner of the notch, refer to related descriptions in FIG. 7. Details are not described herein again.

Figure 9:
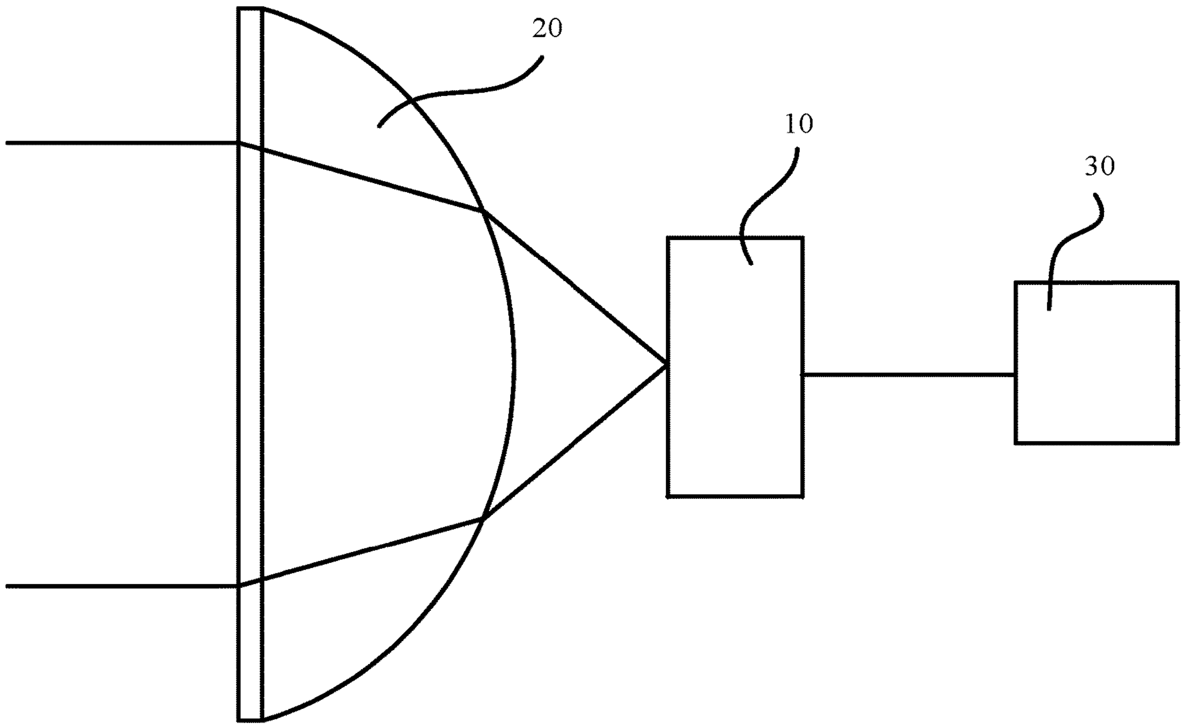
FIG. 9 is a schematic diagram of a structure of a detection apparatus according to an embodiment of this application.

FIG. 9 shows a detection apparatus according to an embodiment of this application. The detection apparatus provided in this embodiment of this application includes a processor 30 and any one of the foregoing lens antennas connected to the processor 30. The processor 30 is configured to process a signal of an antenna, and the processor 30 may include common components such as a radio frequency circuit, a filter, and a low-sound noise reducer. As shown in FIG. 9, the processor 30 is connected to an antenna 10. The processor 30 processes a signal and sends a processed signal to the antenna 10, and the antenna 10 transmits the processed signal through a lens 20 to complete communication. When the foregoing antenna is used, switching between a narrow beam and a wide beam can be implemented by using a radio frequency switch. When scanning needs to be performed, the wide beam may be used. When communication needs to be performed for a specific region, the narrow beam may be used through switching. This improves a detection effect of the detection apparatus.

An embodiment of this application further provides a communication apparatus, and the communication apparatus may be a base station, a router, or another apparatus that can implement communication. The communication apparatus includes a processor and any one of the foregoing lens antennas connected to the processor. Switching between a narrow beam and a wide beam can be implemented by using a radio frequency switch. When scanning needs to be performed, the wide beam may be used. When communication needs to be performed for a specific region, the narrow beam may be used through switching. This improves a detection effect of a detection apparatus.

Figure 10:
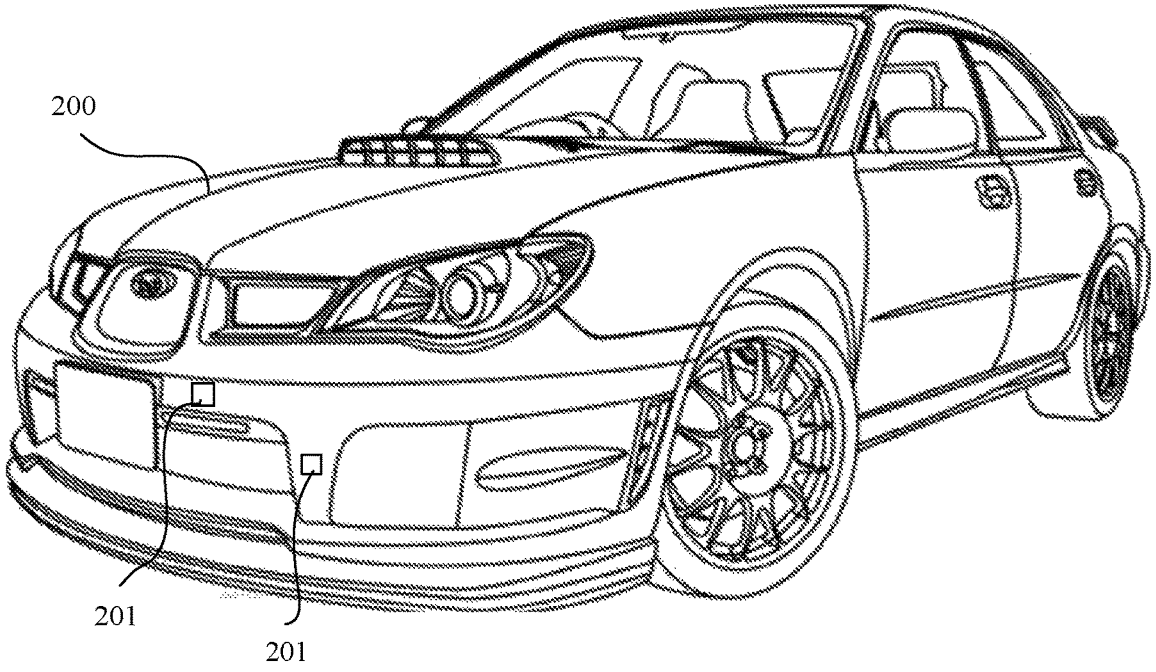
FIG. 10 is a schematic diagram of a structure of an intelligent vehicle according to an embodiment of this application.

FIG. 10 shows an intelligent vehicle according to an embodiment of this application. The intelligent vehicle includes a vehicle body 200 and the foregoing detection apparatus 201 disposed in the vehicle body 200. The detection apparatus 201 in FIG. 10 is merely an example, and does not represent an actual arrangement location of the detection apparatus 201. When the detection apparatus 201 uses the foregoing antenna, switching between a narrow beam and a wide beam can be implemented by using a radio frequency switch. When scanning needs to be performed, the wide beam may be used. When communication needs to be performed for a specific region, the narrow beam may be used through switching. This improves a detection effect of the detection apparatus 201.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A lens antenna, comprising:

a feed source, a radio frequency switch;

at least two narrow beam radiation units;

a wide beam radiation unit; and wherein:

the feed source may selectively feed any narrow beam radiation unit or the wide beam radiation unit by using the radio frequency switch;

the wide beam radiation unit comprises a plurality of radiation sub-units, and the plurality of radiation sub-units are connected to the radio frequency switch by using a power splitter; and a first radiation region of the wide beam radiation unit covers a second radiation region of each narrow beam radiation unit.

2. The lens antenna according to claim 1, wherein a sum of regions covered by all the second radiation regions is the same as the region covered by the first radiation region.

3. The lens antenna according to claim 1, wherein the at least two narrow beam radiation units are disposed around the wide beam radiation units.

4. The lens antenna according to claim 3, wherein a distance between each of the narrow beam radiation units and any adjacent radiation sub-unit is not less than a wavelength corresponding to an operating frequency band of the lens antenna.

5. The lens antenna according to claim 1, wherein the plurality of narrow beam radiation units are arranged in two rows; and the plurality of radiation sub-units are arranged in a single row, and are located between the two rows of the narrow beam radiation units.

6. The lens antenna according to claim 5, wherein:

one diagonal line of any narrow beam radiation unit is parallel to a first direction, and the first direction is an arrangement direction of each row of narrow beam radiation units; and one diagonal line of each radiation sub-unit is parallel to the first direction.

7. The lens antenna according to claim 1, wherein at least one of the following is met:

the lens antenna is a dual-polarized antenna; or each narrow beam radiation unit is a square radiation patch; or each radiation sub-unit is also a square radiation patch.

8. The lens antenna according to claim 7, wherein a notch for increasing a beam width is provided on a side of each radiation sub-unit.

9. The lens antenna according to claim 8, wherein the notch is a triangle.

10. The lens antenna according to claim 1, further comprising:

a substrate that further comprises a first surface and a second surface; and wherein:

the narrow beam radiation unit and the wide beam radiation unit are disposed on the first surface; and the power splitter, the radio frequency switch, and the feed source are disposed on the second surface.

11. The lens antenna according to claim 10, wherein:

the lens antenna further comprises a stratum; and the stratum is embedded in the substrate and is located between the first surface and the second surface.

12. The lens antenna according to claim 1, wherein the power splitter is an equal-power splitter.

13. The lens antenna according to claim 1, where the power splitter may be a microstrip power splitter, a waveguide power splitter, or a coaxial power splitter.

14. A detection apparatus, comprising:

a processor; and a lens antenna connected to the processor, the lens antenna comprising:

a feed source, a radio frequency switch;

at least two narrow beam radiation units;

a wide beam radiation unit; and wherein:

the feed source may selectively feed any narrow beam radiation unit or the wide beam radiation unit by using the radio frequency switch;

the wide beam radiation unit comprises a plurality of radiation sub-units, and the plurality of radiation sub-units are connected to the radio frequency switch by using a power splitter; and a first radiation region of the wide beam radiation unit covers a second radiation region of each narrow beam radiation unit.

* * * * *